United States Patent [19]

Creswell

[11] Patent Number: 4,734,142
[45] Date of Patent: Mar. 29, 1988

[54] BAG SEALING DEVICE

[75] Inventor: Kenneth W. Creswell, Glen Burnie, Md.

[73] Assignee: Vac Pac Manufacturing Co., Inc., Baltimore, Md.

[21] Appl. No.: 898,525

[22] Filed: Aug. 21, 1986

[51] Int. Cl.$^4$ .................. B31B 1/64; B31B 19/60; B32B 31/16
[52] U.S. Cl. .................. 156/73.1; 156/267; 156/358; 156/362; 156/530; 156/580.1; 425/174.2; 493/194; 493/203
[58] Field of Search .................. 156/73.1, 73.3, 73.4, 156/267, 580.1, 530, 580.2, 515, 358, 362; 493/194, 199, 203; 425/174.2

[56] References Cited

U.S. PATENT DOCUMENTS

| 3,920,503 | 11/1975 | Keeler | 156/580.2 |
|---|---|---|---|
| 4,159,220 | 6/1979 | Bosche et al. | 156/358 |
| 4,244,772 | 1/1981 | Achelpohl | 156/515 |
| 4,517,790 | 5/1985 | Kreager | 156/73.3 |
| 4,552,551 | 11/1985 | Dreckmann | 493/194 |
| 4,629,530 | 12/1986 | Becking | 156/73.4 |
| 4,630,429 | 12/1986 | Christine | 156/515 |

Primary Examiner—Donald E. Czaja
Assistant Examiner—Lori Cuervo
Attorney, Agent, or Firm—Murray and Whisenhunt

[57] ABSTRACT

Sealing device suitable for sealing bagging material containing, for example, produce, such as meat or poultry, to form a produce-containing bag having a seal at one or both ends, and being particularly adapted for cooking or defrosting the produce in a microwave oven. The device includes an ultrasonic sealing horn having a sealing surface, and a guide associated with the sealing horn for guiding material to be sealed into contact with the sealing horn. An anvil is provided for clamping the material against the sealing horn to facilitate the formation of a seal nugget upon actuation of the sealing horn. A bag clamp is pivotably mounted to the guide, and includes first and second spaced-apart arms. The first arm is abuttingly contactable with a clamp stop disposed adjacent one side of the sealing horn behind a plane containing the sealing surface of the sealing horn, and the second arm has a cut out portion which passes through the plane containing the sealing surface of the sealing horn upon pivotal movement of the bag clamp towards the sealing horn. In this way, the bag clamp, upon such pivotal movement, wraps the bagging material around the sealing horn to tighten the bagging material across the sealing surface of the sealing horn and thereby facilitate the formation of a good seal. A trigger is associated with the guide for actuating the sealing horn, anvil and bag clamp as the bagging material is moved along the guide into sealing position against the horn.

16 Claims, 12 Drawing Figures

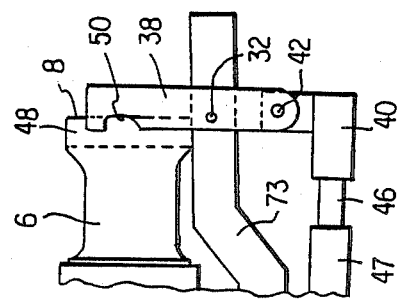
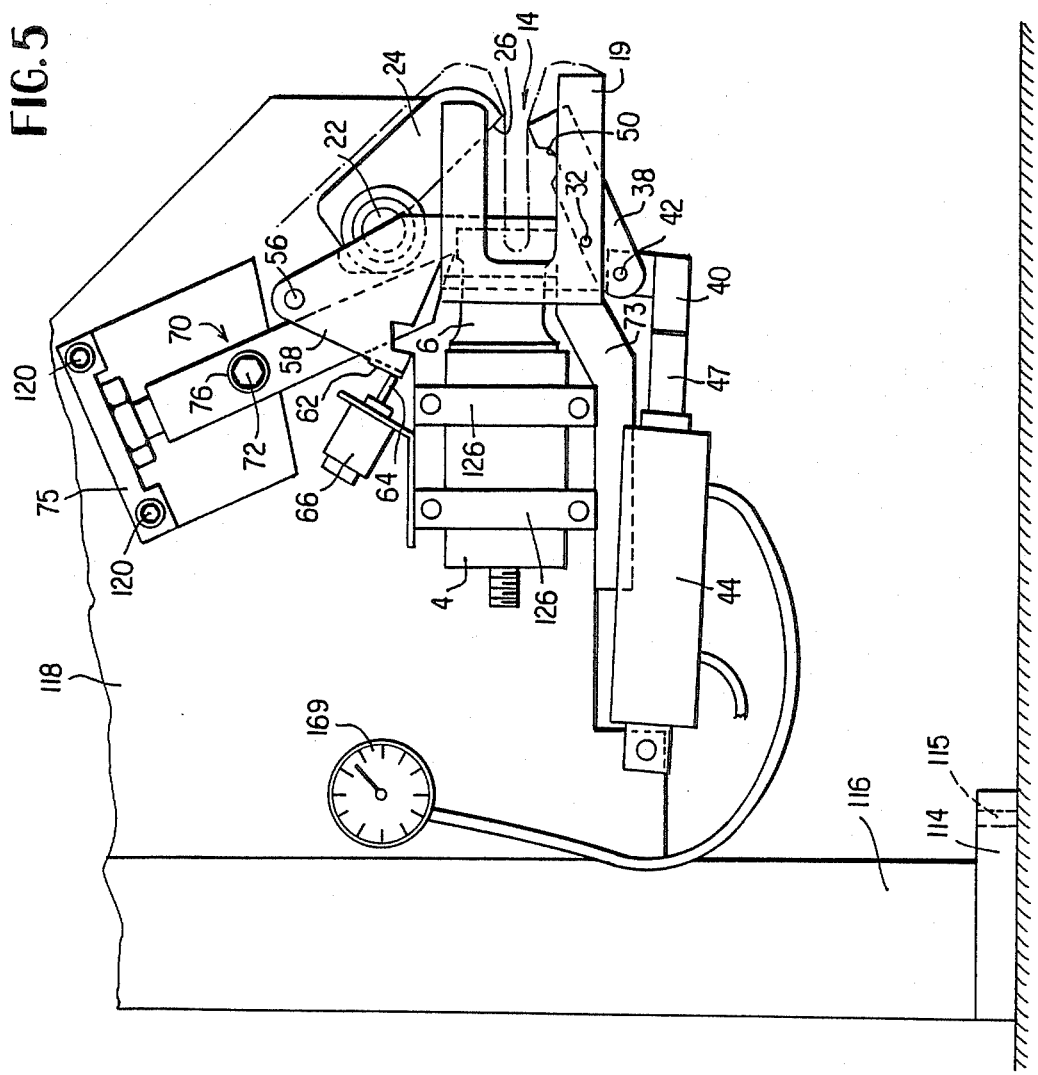

BAG SEALING DEVICE

The present invention relates to sealing devices, and in particular to an ultrasonic sealing device for forming seals in polymeric bagging material containing items, such as meat or poultry.

BACKGROUND OF THE INVENTION

It is well known to utilize ultrasonic sealing techniques for forming seals in polymeric materials. United States patents disclosing the use of ultrasonic techniques are U.S. Pat. Nos. 3,468,731 to Obeda, 4,075,046 to McDonald, 4,190,690 to Rabeneck et al, and 4,333,791 to Onishi.

The Obeda patent discloses an ultrasonic sealing apparatus for sealing the end portion of thermoplastic tubular containers. The end portion of a tubular container is placed in contact with an anvil, and an ultrasonic sealing horn is brought into pressing engagement with the end portion to produce the desired ultrasonic seal.

The McDonald patent relates to the formation of rigid portions in flexible structures utilizing an ultrasonic sealing device, and is particularly directed to the fabrication of shoelaces having rigid tips. In operation, a shoelace material is placed in a parallel-walled slot in an anvil, and an ultrasonic sealing horn is moved downwardly into pressing engagement with the material to effect formation of the rigidified portion.

The Rabeneck et al patent discloses a method and apparatus for the manufacture of sealed-end tubular thermoplastic net bagging. In operation, an ultrasonic sealer is mounted for vertical reciprocal movement into pressing engagement with netting feedstock which has been twisted, followed by sealing to form an integral seal nugget.

The Onishi patent relates to an ultrasonic seam welding apparatus for seam welding together sheet-like workpieces piled on top of each other. The workpieces are positioned above a vertically movable ultrasonic sealing horn, and pressure is imparted to the workpieces by raising the ultrasonic sealing horn to urge the workpieces into contact with a roller assembly located above the workpieces.

It has now been found that a need exists for a device which can be used for ultrasonically sealing bagging material containing products to form sealed product-containing bags having ultrasonic seals at one or both ends. This application finds particular utility in the produce industry, especially in the packaging of meat and poultry, where such a device would facilitate the formation of produce-containing bags having ultrasonic seals at one or both ends which ultimately could be used in a microwave oven for cooking or defrosting, due to the absence of metal clips or other metal components in the bag. Such a device would have to be easy to use by produce packers and be capable of adjustment for sealing different types of bagging material. The device would also have to be waterproof so as to permit a wash-down at the end of a day's usage, in accordance with usual hygiene standards associated with the food processing and packaging industries. Such a device has now been developed by the present inventors and this is described below.

SUMMARY OF THE INVENTION

According to one aspect of the present invention, there is provided a sealing device comprising an ultrasonic sealing means, including an ultrasonic sealing horn having a sealing surface for imparting ultrasonic energy to the material to be sealed. A guide means is associated with the sealing means for guiding the material into contact with the sealing horn, and an anvil means is connected to the guide means for clamping the material in sealing position against the sealing horn. A clamping means is connected to the guide means for clamping the material on at least one side of the sealing horn during the sealing of the material, whereby the material is wrapped around and tightened across the sealing surface of the sealing horn to facilitate formation of a seal.

According to a preferred aspect, a trigger means is connected to the guide means for actuating the sealing means, the anvil means and the clamping means as the material is moved along the guide means towards the sealing horn.

According to a further preferred aspect, the present device comprises a cutting means for cutting the material after sealing to produce individual bags having at least one sealed end.

According to another aspect of the present invention, there is provided a method for sealing material, comprising the steps as providing a device as described above, and bringing material to be sealed into contact with the sealing horn via the guide means. Actuation of the anvil means, the clamping means and the sealing means effects sealing of the material. The method preferably further includes the step of cutting the sealed material to produce bagging including at least one sealed end.

The device of the present invention has numerous advantages, not enjoyed by prior sealing devices. In particular, the device of the present invention is compact and readily installed, and is simple to operate. The device is particularly adapted for use by produce packers, for example in the poultry and meat packaging industries, and enables quick and easy formation of produce-containing packages having ultrasonically formed seals at one or both ends. As will be described in more detail below, the device of the present invention can be readily adjusted so as to enable different types of materials to be sealed, and the present device also has the advantage of being waterproof, with minimum associated electric components, thereby permitting wash-down after use without damaging the device. The present device is suited for manual operation in which individual bags are sealed at one or both ends one at a time, and the device may be used in conjunction with an evacuation arrangement, so that the bags can be evacuated and sealed under vacuum. In addition, the device of the present invention may be used in conjunction with automatic bag packing apparatus which in the past have utilized metal clipping devices to seal the packages. By employing the device of the present invention with such automatic packing apparatus, it is possible to automatically form packaged bags which may or may not be evacuated and which have ultrasonic seals at one or both ends.

BRIEF DESCRIPTION OF THE DRAWINGS

Preferred aspects of the present invention will now be described in more detail with reference to the accompanying drawings, in which:

FIG. 5 is a partial side view of the device of FIG. 3 as seen from the other side;

FIG. 6 is a partial side view of the device of FIG. 1 as seen from the other side;

DETAILED DESCRIPTION OF THE INVENTION

Figure 1:
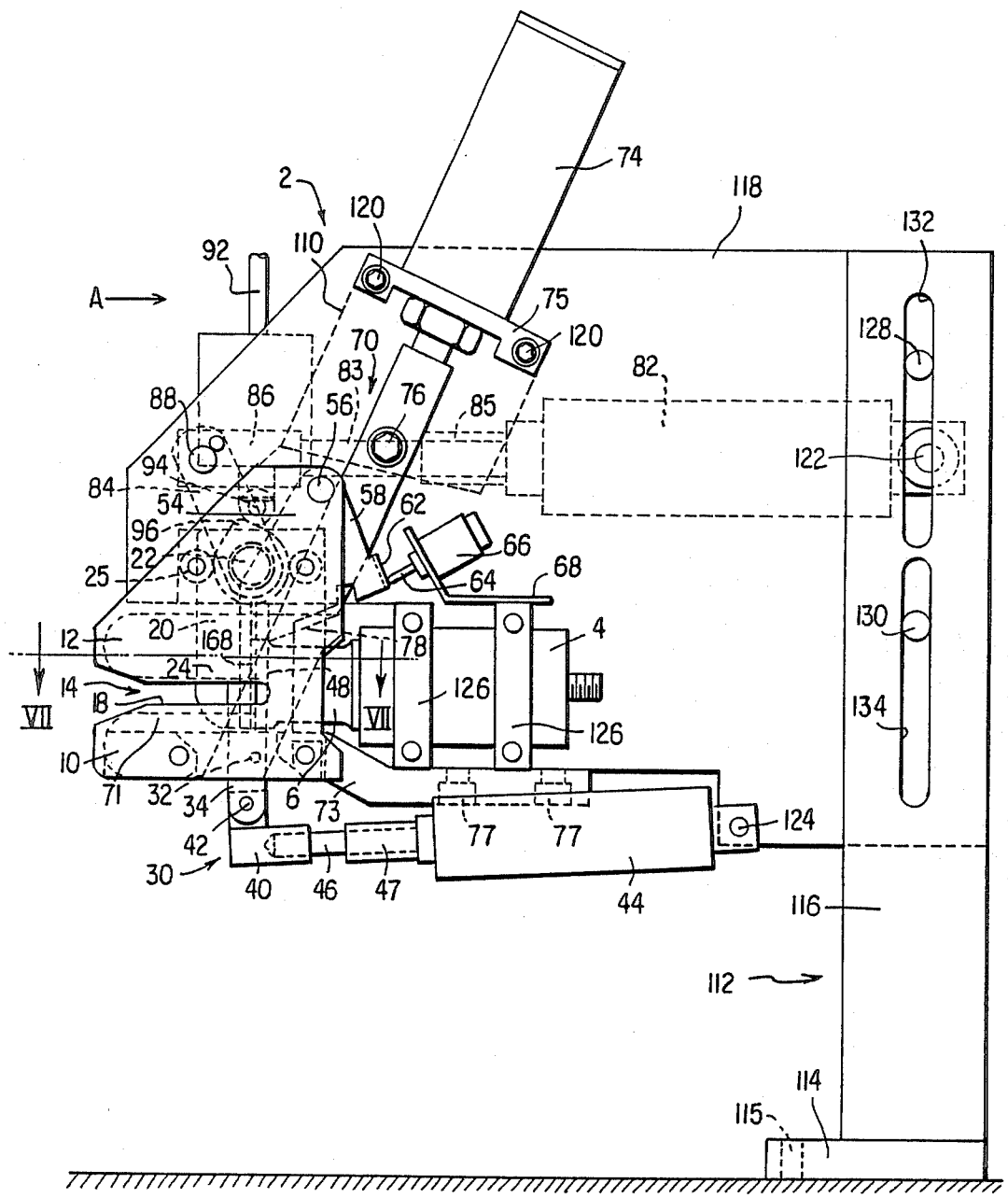
FIG. 1 is a side view of the invention.
Figure 2:
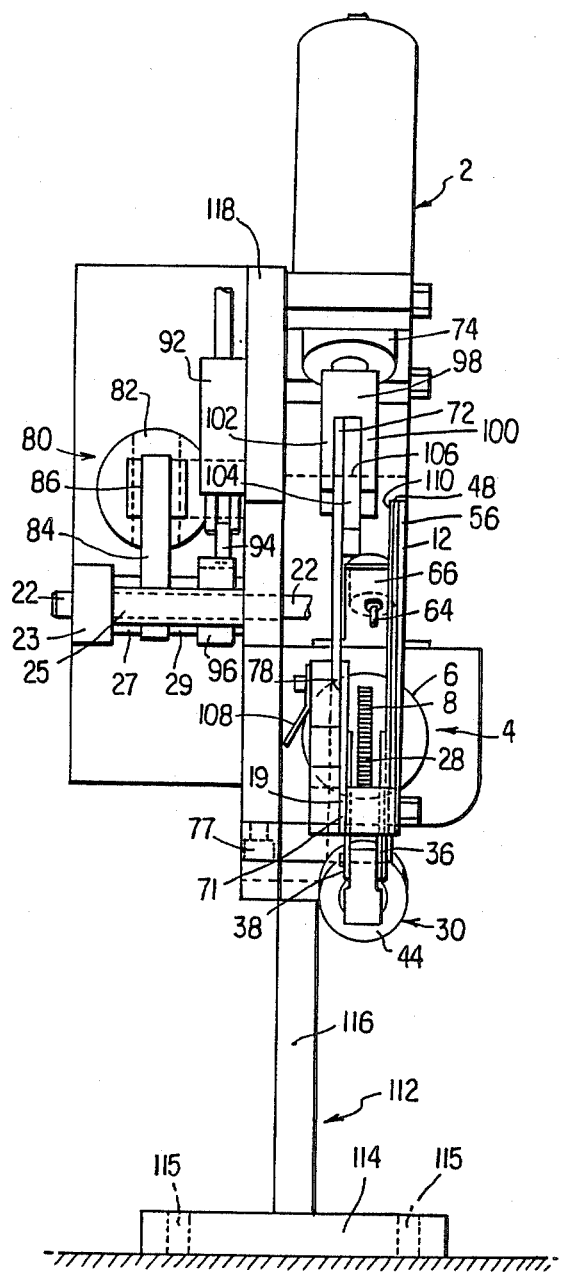
FIG. 2 is an end view of the device of FIG. 1 in the direction of arrow A.

Referring to FIGS. 1 and 2, there is shown a device of the present invention, generally referenced 2. The device 2 comprises an ultrasonic sealing means 4 having a sealing horn 6 with a sealing surface 8. The sealing means 4 is mounted to a main frame member 118 by mounting brackets 126. The ultrasonic sealing means 4 may be any suitable ultrasonic sealing horn, such as a Branson model number 23187 capable of producing ultrasonic vibrations of the order of 20 to 40 KHz preferably 40 KHz in view of the smaller equipment involved.

A guide means 10 is associated with the sealing horn 6 for guiding material to be sealed into contact with the sealing surface 8 of the sealing horn 6. The guide means 10 includes a side cover plate 12 having a U-shaped slot defining a guide path 14 with upper and lower surfaces 16, 18. As will be seen from FIG. 1, the upper and lower surfaces 16, 18 are parallel for the majority of their length and are divergent at their outer edges for easy access of material to be sealed. It will be understood however that the upper and lower surfaces of the guide path 14 may be divergent for the entire of their length, thereby defining a V-shaped guide path, as desired. The purpose of the guide path 14 is to bring the material to be sealed into proper positional engagement with the sealing surface 8 of the sealing horn 6, and also to effect at least some radical converging of the material so that, together optionally with some manual twisting, the material when in sealing position against the sealing surface 8 is preferably in a twisted and radially converged state. As will be seen from FIG. 2, the side cover plate 12 is disposed on the right hand side of the sealing horn 6, and a second U-shaped guide surface 19 is disposed on the left hand side of the sealing horn (as viewed in FIG. 2) for providing additional guiding support to the material as it is moved along the guide path 14.

With reference to the material to be sealed with the device, it is to be understood that any suitable polymeric bagging material may be used including, for example, high tensile strength polyester film material, such as polyalkylene terephthalate, e.g. Mylar, or a tubular thermoplastic netting material such as Vexar marketed by Amoco. While any of the film materials earlier identified can be used, a preferred material is Mylar film, and another material which can be used is Clysar, which is a Dupont trademark relating to polyolefin film, such as polyethylene or polypropylene film. Other polymeric film materials which can be used include but not limited to high or low density polyethylene, polypropylene, polybutylene polymers and copolymers, copolymers of ethylene and vinyl esters, especially ethylene vinyl acetate copolymers, polyvinylidene chloride-vinylchloride copolymers, commonly referred to as saran, polymers of vinylchloride, copolymers of propylene and ethylene, polymers of styrene, polyesters, and polyamides. The term "polymeric" as used herein is used broadly to cover homopolymers, copolymers and terpolymers.

An anvil means 20 is provided for clamping material to be sealed into a sealing position against the sealing surface 8 of the sealing horn 6. The anvil means 20 includes an anvil plate 24 having a contact surface 26, which is abuttingly contactable with the sealing surface 8 of the sealing horn 6. As can be seen in FIG. 2, in which the anvil plate 24 is not shown for clarity, the sealing surface 8 may, if desired, be provided with knurling 28 to impart a roughened surface to the resulting seal, and the contact surface 26 of the anvil plate 24 may also, if desired, be provided with knurling similar to that provided on the sealing surface 8. The anvil plate 24 is mounted on a drive shaft 22 which is pivotally movable to impart arcuate movement to the anvil plate between a closed position (see FIG. 1) in which the anvil plate is in the guide path 14 and is in sealing contact with the sealing surface 8 of the sealing horn 6, and an open position (see FIG. 3) in which the anvil plate is remote from the sealing surface 8 and out of the guide path 14. The way in which the anvil plate is moved from the open to the closed position is described in detail below.

Figure 3:
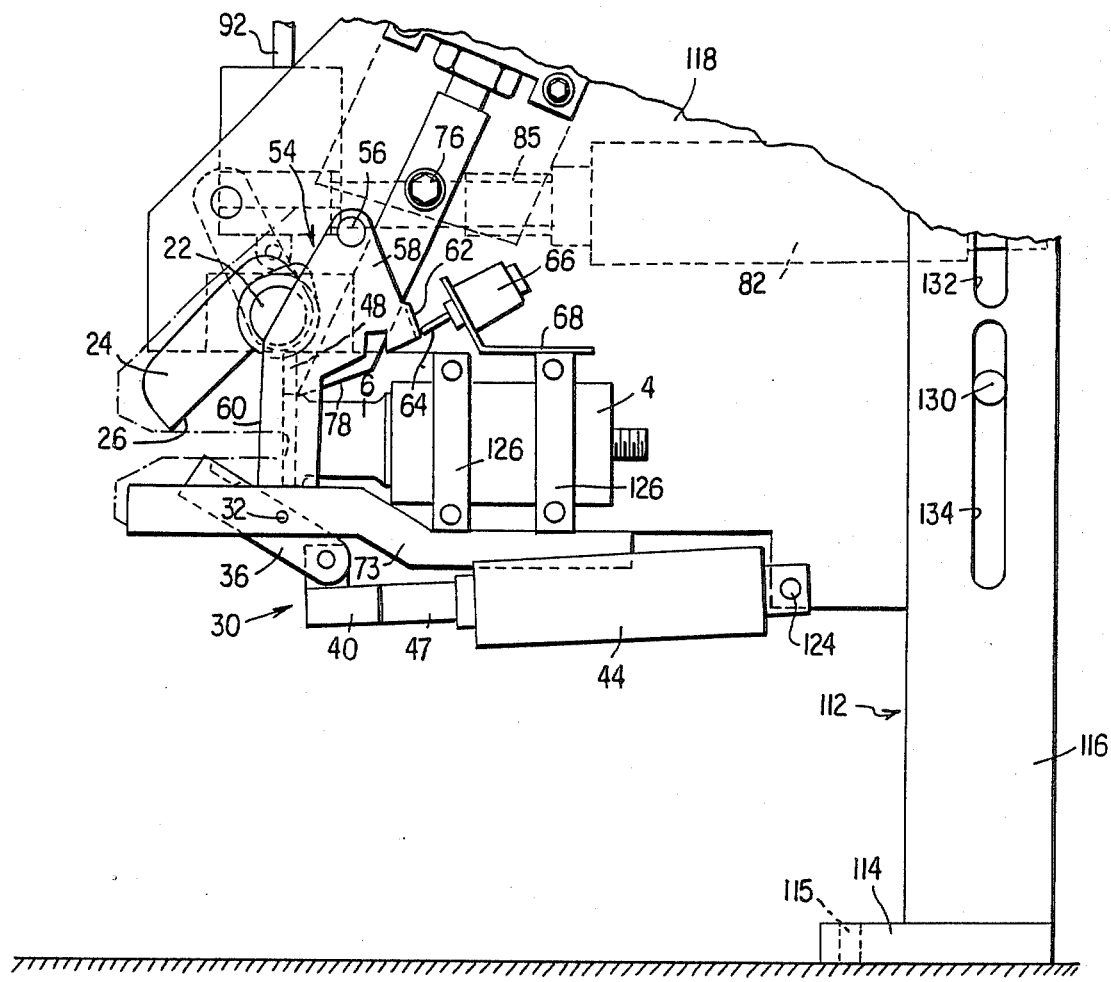
FIG. 3 is a partial side view of the device of FIG. 1 with the anvil means and clamping means in an open position.
Figure 4:
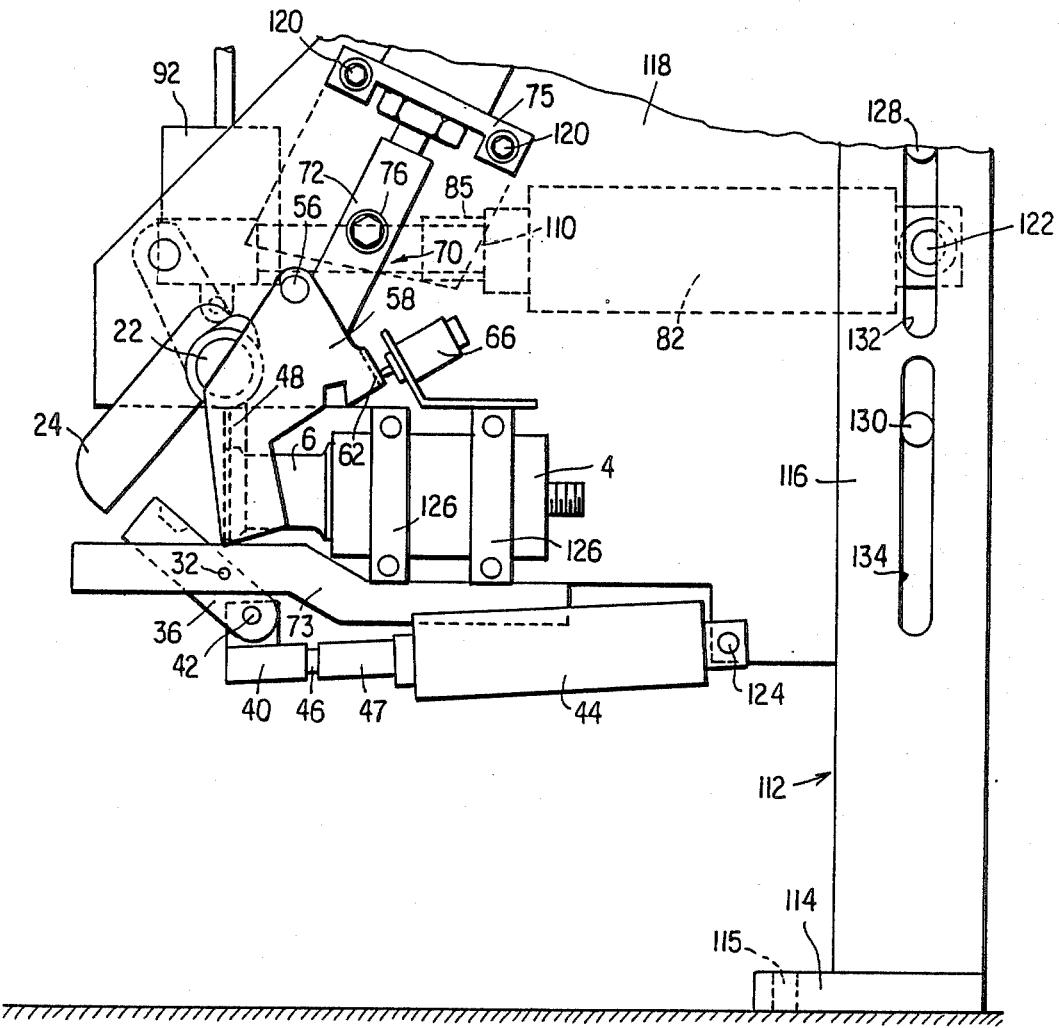
FIG. 4 is a partial side view of the device of FIG. 1 with the anvil means and the clamping means in a partially closed position.
Figure 7:
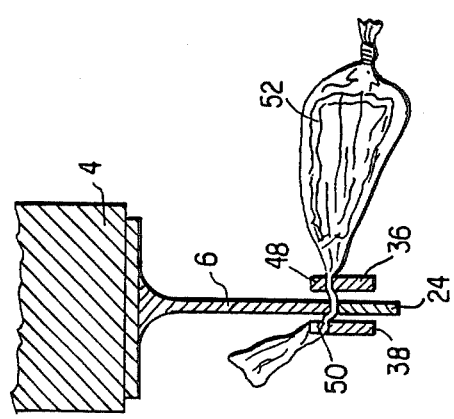
FIG. 7 is a partial plan view of the device of FIG. 1 taken along the line VII—VII showing the anvil means and clamping means in closed position.

A clamping means 30 is pivotally connected to the guide means at pivot point 32 clamping the material to be sealed on either side of the horn and wrapping the material around the sealing horn 6 during sealing of the material. The clamping means 30 includes a clamp 34 having two spaced-apart arms 36, 38 each pivoted to the common pivot point 32. The arms 36, 38 are connected to a clamp cylinder clevis 40 by a clamp clevis pin 42. The clamp cylinder clevice is connected to a clamp cylinder 44 by a piston 46, and reciprocal movement of the piston 46 into and out of the clamp cylinder 44 and thus pivotal movement of the clamp 34 is limited by a cylinder stop 47. The clamp 34 is movable between an open position, as depicted in FIG. 3, in which the clamp cylinder clevis 40 is fully retracted to the right as seen in FIG. 3 and the arms 36, 38 are inclined away from the sealing horn 6 and out of the guide path 14, through a partially closed configuration as shown in FIG. 4 in which the clamp cylinder clevis 40 is partially extended to the left and the arms 36, 38 are inclined closer to the sealing horn 6, and a closed clamping position in which the clamp cylinder clevis 40 has moved fully to the left as shown in FIG. 1, and the arms 36, 38 are disposed adjacent to and on either side of the sealing horn 6. In the closed position, the arm 36 abuttingly contacts a clamp stop 48 disposed adjacent and to the right of the sealing horn 6 (as viewed in FIG. 2) with the clamp stop 48 being disposed behind the plane containing the sealing surface 8 (i.e. to the right of the sealing surface 8 as viewed in FIG. 1). The arm 38 has a cutout portion 50, and extends beyond the plane of the sealing surface 8 so that, in the closed position of the clamp 34, arm 36 clamps and wraps material around one side of the sealing horn 6 and the cutout portion 50 collects and wraps material around the other side of the sealing horn 6 to tighten the bagging material across the sealing surface 8 and thereby facilitate the formation of a good seal between the sealing horn and the anvil means 20. The arm 38 with cutout portion 50 is clearly depicted in FIGS. 5 and 6, and the wrap-around effect of the arms 36 and 38 is illustrated in FIG. 7 in which sealing of a produce-containing package 52 is illustrated.

The clamp 34 and anvil means 20 are actuated by a trigger means 54 pivotally mounted to the side cover plate 12 at pivot point 56. The trigger means 54 includes a trigger plate 58 having a material contact surface 60 extending across the U-shaped guide path 14 between surfaces 16 and 18 and a valve cam surface 62 which is contactable with trip valve plunger 64 of a trip valve 66. The trip valve 66 is supported on a trip valve bracket 68 which is mounted on one of the mounting brackets 126. The manner in which the trip valve 66 actuates the device is described below.

In order to effect severance of the material after sealing, a cutter means 70 is provided, including a lower blade 71 supported on a support arm 73, and a sharpened blade 72 connected to a cutter cylinder 74 by a bolt 76. The cutter cylinder 74 is mounted to a support member 75 which is bolted to the main frame member 118 with bolts 120. The support arm 73 is bolted to the main frame member 118 with bolts 77. Actuation of the cutter cylinder 74 causes reciprocal slicing movement of the blade 72 past the lower blade 71 and through the material at a point separated from the seal to effect severance of the material. As can be seen from FIG. 1, the cutter means 70 is mounted at an angle of about 70 degrees, with the angle of the cutting edge 78 of the blade 72 being at an angle of about 30 degrees to the surfaces 16, 18. This inclination of the cutting edge increases the slicing action of the cutting edge across the material upon downward movement of the blade 72.

As can be seen in FIG. 2, the blade 72 is mounted to a cutter bracket 98 as having two spaced-apart members 100 and 102. The blade 72 is mounted between the members 100, 102 together with a spacer 104. The blade 72 and spacer 104 are maintained between the spaced-apart members 100, 102 by means of a cutter pin 106. For safety, a finger guard 108 is provided on one side of the sealing horn 6, and a cutter guard 110 is provided on the other side of the sealing horn in order to minimize the risk of injury to the user during operation of the device.

Referring to the operation of the anvil means 20, the drive shaft 22 to which the anvil plate is mounted is connected to an anvil drive mechanism 80 which is more clearly depicted in FIG. 2. The anvil drive mechanism 80 includes an anvil cylinder 82 which is connected via piston rod 83 and connecting member 86 to anvil drive arm 84. One end of the anvil drive arm 84 is connected to the connecting member 86 at pivot point 88, and the other end of the anvil drive arm 84 is connected to the anvil drive shaft 22. Reciprocal movement of the piston rod 83 into and out of the cylinder 82 causes rotation of the drive shaft 22 and, in turn, effects arcuate movement of the anvil plate 24 between the closed position as depicted in FIG. 1 where the contact surface 26 is closely adjacent or in contact with the sealing surface 8 of the sealing horn 6 and the open position as depicted in FIG. 3, where the contact surface 26 is remote from the sealing surface 8. The extent of rotation of the anvil drive shaft 22 is controlled by a stop 85 against which the connecting member 86 abuts to define the limit of reciprocal movement of the piston rod 83.

Also mounted on the drive shaft 22 is a limit switch cam 96 which is contactable by cam action through rotation of the cam 96 with reciprocally movable switch member 94 of limit switch 92 (which is a micro switch) mounted on the main frame 118. The shaft 22 is supported by a shaft support 23 connected to a stand off 25. The anvil drive arm 84 and the limit switch cam 96 are maintained in their relative positions on the shaft 22 by spacers 27 and 29.

The device can be employed in the orientation shown in the Figures in which the sealing horn 6 (as viewed in FIG. 2) is vertical or can be employed with the device rotated through 90 degrees so that the sealing horn is disposed horizontally. The device may be mounted to a wall, or can be mounted to a support frame 112, as depicted in the drawings. The support frame can include a support base 114 having mounting apertures 115 connected to a support stand 116, with the main frame member 118 being connected to the support stand 116 by bolts 128, 130 fastened through slots 132, 134. The anvil cylinder 82 is pivotally connected to the support stand 116 at a pivot point 122, and the clamp cylinder 44 is pivotally mounted to the main frame member 118 at the pivot point 124. The anvil drive mechanism 80 is mounted to the other side of the main frame member 118 (see FIG. 2) by appropriate mounting members (not shown). The relative positioning of the main frame member 118 with respect to the support stand 116 can be adjusted by loosening the bolts 128, 130 and moving along the slots 132, 134 to the desired location.

Figure 8:
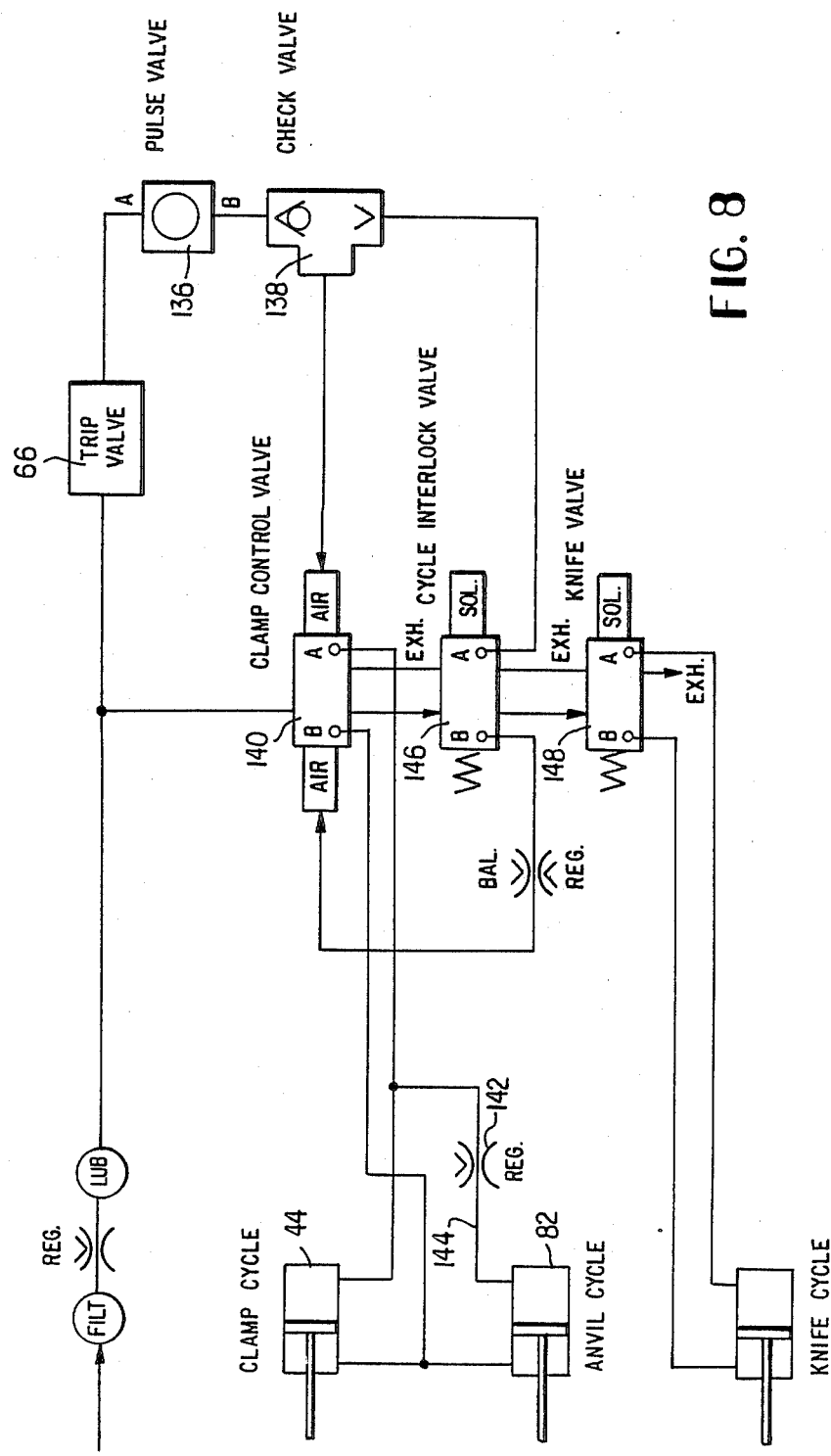
FIG. 8 is a schematic diagram of a hydraulic system for actuating the device of the invention.

Referring to the pneumatic schematic diagram shown in FIG. 8, movement of the trigger means 54 upon advancing material to be sealed along the U-shaped guide path 14 towards the sealing surface 8 of the sealing horn 6 actuates the trip valve 66 as a result of depression of the trip valve plunger 64 by the trip valve cam surface 62. Actuation of the trip valve 66 sends a signal to pulse valve 136 which generates an air pulse which is transmitted to check valve 138. The check valve 138 actuates pneumatically actuated clamp control valve 140 which actuates simultaneously the anvil cylinder 82 and the clamp cylinder 44. A regulator 142 is provided in line 144 connected to the anvil cylinder 82 for adjusting the sealing pressure applied by the anvil plate 24 against the material to be sealed by the sealing horn 6. Generally, no such adjustment is required in terms of the pressure applied by the clamping means 30, although there may be circumstances where adjustment is required, for example where thicker material is being used which requires increased clamping pressure. Adjustment of the sealing pressure is desirable in situations where bags of different sizes or different materials are being sealed by the device of the invention. Thus, the anvil plate 24 is adjusted so as to exert sufficient pressure on an axially short segment of the twisted converged material so that frictional heat generated by the application of vibrational energy stands through the entire mass of the compressed segment to produce a strong and uniform seal nugget. The pressure exerted on the material varies according to the seal time and the subsequent hold time during which power to the sealing horn is switched off while the anvil plate is still in the closed position to permit adequate solidification of the newly formed seal nugget. Thus, for example, if the pressure applied to the material is reduced, then the seal time and the hold time are usually increased to obtain a satisfactory seal. The pressure, seal time and hold time parameters will also vary according to the nature of the material used, the width of the material, and the thickness of the material. Generally speaking, if bags of heat shrinkable Mylar film having a thickness of 0.65 mm and a width of about 6 inches are used, then the anvil plate 24 is set to apply a pressure of about 20 to 100 psi, for example about 40 to 60 psi, to the axially short segment. A seal time of about 0.25 to 1.0 second, such as 0.6 to about 0.9 second, for example about 0.8 second, and a hold time of about 0.3 to about 0.75 second, for example about 0.5 second, will generally produce a satisfactory seal. If the width of the material is increased, then it is generally necessary to increase the pressure at which the anvil plate 24 is urged against the material. From the above, it will be understood that satisfactory working parameters are very much dependent on the nature and size of the material employed, and determination of the parameters can be readily achieved by systematic experimentation of pressures, seal times and hold times.

When the seal time and hold time sequence has been completed (this is described in more detail below in connection with FIG. 9), a signal is transmitted from the clamp control valve 140 to a cycle interlock valve 146 which, in turn, sends a signal to a knife valve 148. Both the cycle interlock valve and the knife valve are actuated electrically, and both are spring biased to return to their original positions when the electricity is switched off. The knife valve is not actuated until after a certain time period has elapsed after formation of the seal, as described in more detail below.

Figure 9:
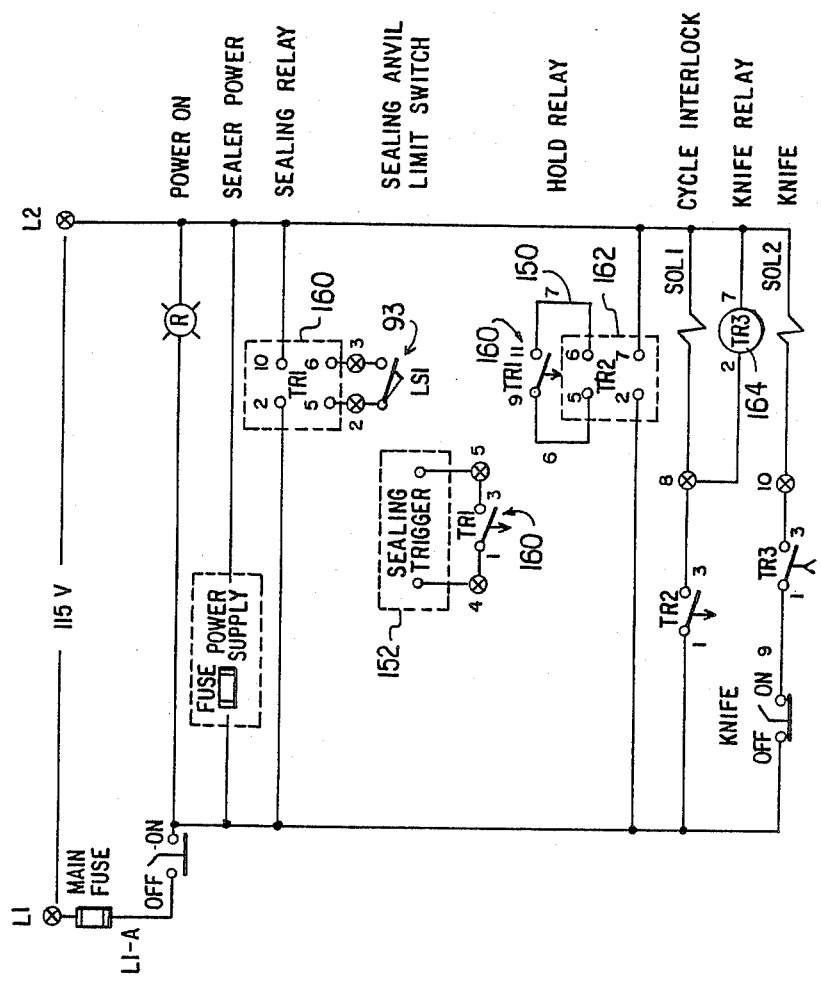
FIG. 9 is a schematic circuit diagram for the device of the invention.

Referring now to FIG. 9, actuation of the anvil cylinder 82 by movement of the trigger means 54 and trip valve 66 as discussed above causes rotation of the limit switch cam 96. Reciprocal vertical movement is thus imparted to the reciprocal switch member 94 of the limit switch 92 to close LS1 93 (see FIG. 9), and to thereby initiate the timing cycle of the TR1 sealing relay 160. Closure of LS1 also closes the 1 and 3 contact points of TR1 which actuates a sealing trigger 152 connected to the sealing horn 6. When TRI times out, and sealing has been completed, hold relay TR2 162 is turned on whereby the anvil plate 24 is maintained in contact with the material in which the seal has just been formed but without the application of power to the sealing horn 6 to afford a cooling period for the seal. When TR2 times out, TR2 then sends a signal to knife relay TR3 164 via the cycle interlock valve to actuate the cutter means 70 to sever the sealed material adjacent to the newly formed seal.

Figure 10:
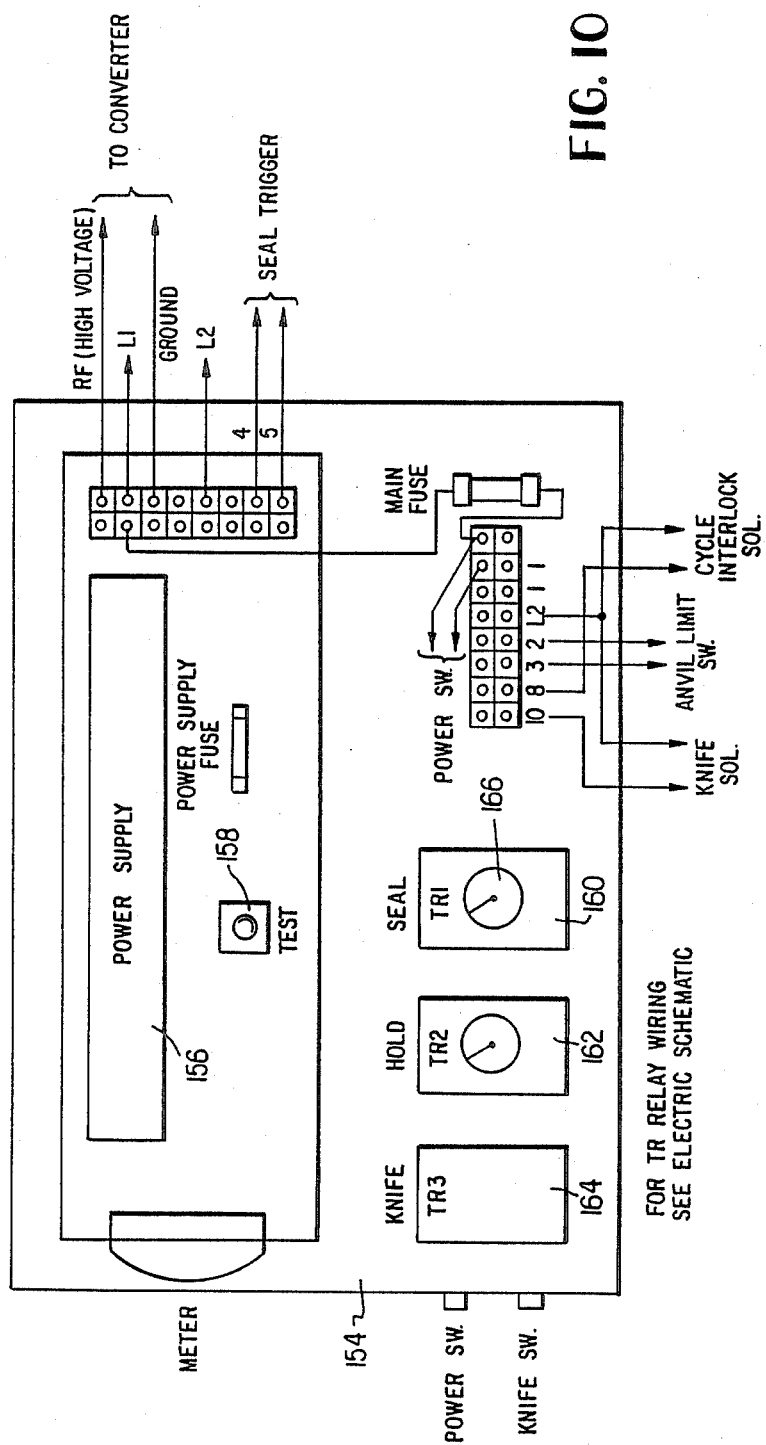
FIG. 10 is a schematic diagram showing a control unit for the device of the invention.

FIG. 10 shows a schematic of a control cabinet 154 for the device of the invention. The cabinet 154 contains a power supply 156 and a test button 158 for ensuring correct operation of the power supply. An adjustable switch 160 is provided for adjusting the sealing relay to vary the seal time during which power is applied to the sealing horn 6 for formation of a seal, and an adjustable switch 162 is provided for adjusting the hold relay to vary the hold time that the anvil is maintained in position against the formed seal with the power switched off to allow for cooling of the formed seal. Switch 164 controls the knife relay TR3, and is non-adjustable from a time standpoint since adjustment of the time of operation of the cutter is generally not required. The remaining components in the cabinet 154 are power supply components for supplying power to the converter of the sealing horn 6, to seal trigger 151, to the limit switch 96, and to the respective solenoids of the knife valve 148 and the cycle interlock valve 146.

Figure 11:
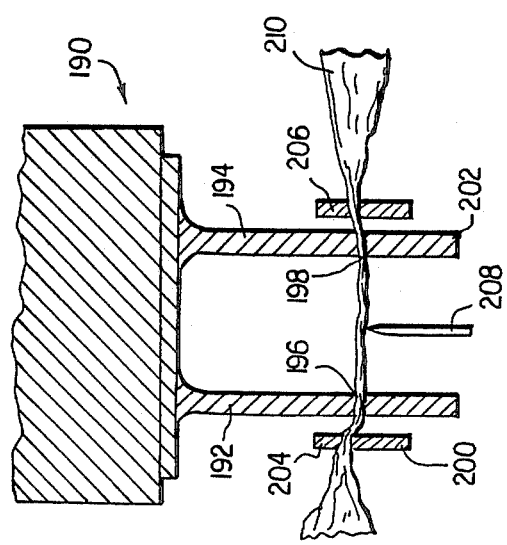
FIG. 11 is a schematic plan view of an alternative embodiment of the invention.

FIG. 11 is a schematic plan view of an alternative embodiment of the invention, in which the ultrasonic scaling means 190 has two spaced-apart sealing horns 192, 194 with respective sealing surfaces 196, 198. Each sealing horn 192, 194 has associated therewith a respective anvil 200, 202, and clamping means 204, 206 are provided outwardly of the sealing horns 192 and 194, respectively. A cutting means 208 is disposed between the sealing horns 192, 194 for severing material 210 after formation of ultrasonic seals between the respective horns and anvils 192, 200 and 194, 202. As with the clamping means 30 discussed in detail earlier, the clamps 204 and 206 function both to wrap and to clamp the material to be sealed around the respective sealing horns 192, 194 during sealing of the material. If desired, additional clamping means (not shown) could also be provided between the sealing horns 192, 194, in order to increase the wrap around effect of the material around each sealing horn, with sufficient space being maintained between such additional clamping means to accommodate the cutter 208. Completion of the sealing and cutting operation using the embodiment illustrated in FIG. 11 will produce two bags each having a newly formed ultrasonic seal at an end thereof. Packing of each bag with a product followed by sealing of the other end using the device of the invention, optionally with evacuation, will then produce a packaged product, optionally evacuated, with ultrasonically formed seals at each end of the package.

In use, material to be sealed, for example a bag containing a product, is advanced along the U-shaped guide path 14 to actuate the trigger means 54. Best results are obtained if the top of the bag is twisted at the point where the seal is to be formed. When the trigger means 54 is actuated, a sealing cycle begins and continues automatically to completion. As described above in connection with the FIGS. 8 through 10, the sealing cycle involves the simultaneous actuation of the anvil means and the bag clamping means followed by actuation of the sealing horn and then, following a hold cycle during which the newly formed seal is cooled, the cutter means is actuated. The seal time, i.e. the period of time that energy is applied to the sealing horn while the bag is clamped against the sealing horn, is ordinarily set to a period of about 0.75 to about 1 second. This setting will vary according to the size of the bag being sealed, and/or the material used for the bag, and can be varied from about 0.5 to about 5 seconds by means of the adjustable switch 160. The adjustment is made by rotating a knob 166 on top of the adjustable switch 160. The anvil clamp pressure is normally set at between about 60 to 100 psi. Usually wider bags require higher air pressure, and if the seal appears to be too thin, it will probably be necessary to reduce the anvil air pressure or the seal time, or both. The anvil clamp pressure is adjusted by rotating an air pressure regulator 169 located at an appropriate point on the device.

In practice, it is preferred to introduce the bag containing the product so that the product is on the same side of the sealing horn as the clamp stop 48. In this way, stretching or other weakening of the newly formed seal due to the weight of the product in the bag is minimized by the clamping action of the arm 36 against the clamp 48. The device of the present invention may be used in conjunction with a vacuum source (not shown) whereby air is evacuated from the bag prior to sealing. Any conventional vacuum source may be utilized for such a purpose.

Figure 12:
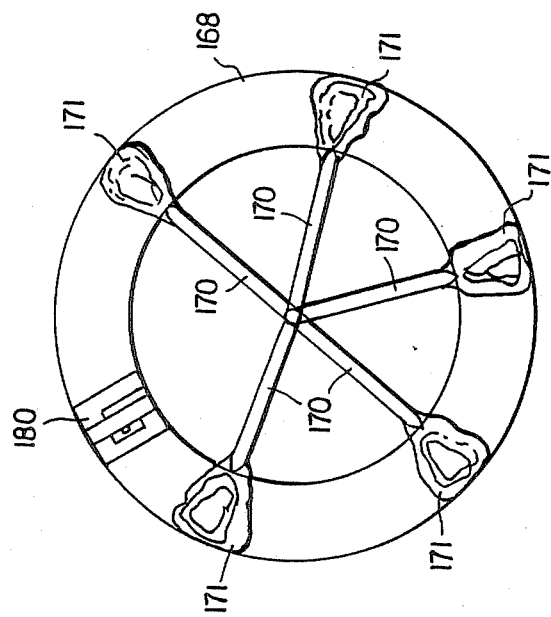
FIG. 12 is schematic plan view of the device of the invention employed with an automatic packaging apparatus.

The device of the present invention may also be utilized as part of an automated arrangement for packaging and sealing of items in bags. FIG. 12 illustrates an example of such an arrangement in which products, for example meat or poultry, are vacuum packaged on a rotating product table 168 having vacuum nozzles 170 for evacuating the bags 171 prior to sealing with the device of the invention. In this way, complete packaging of the products can be handled by a single operator who simply places the open ended bags coming from a bagging station onto empty vacuum nozzles, with the evacuation and sealing being conducted automatically thereafter. The sealing in such automatic operations has in the past been effected with metal clipping apparatus. However, such devices are subject to malfunction, and the resulting metal clipped packages suffer from disadvantages. For example, they cannot be used in microwave ovens for cooking or defrosting of the product contained in the bags, and the metal clips sometimes migrate into the product, thereby giving rise to customer complaints. These disadvantages are overcome by incorporating a device of the present invention in such an automatic packaging and evacuation arrangement.

I claim:

1. A sealing device, comprising:
   an ultrasonic sealing means, including an ultrasonic sealing horn having a sealing surface for imparting ultrasonic energy to material to be sealed;
   guide means associated with said sealing means for guiding said material along a guide path into contact with said sealing horn;
   anvil means associated with said guide means for pressing said material into sealing position against said sealing horn; and
   clamping means pivotally connected to said guide means for clamping said material beside said sealing horn, said clamping means being movable between a first position in which said clamping means clamps said material beside said sealing horn so that said material is wrapped around and stretched across said sealing surface during sealing of said material, and a second position in which said clamping means is clear of said guide path to facilitate passage of said material through said guide means.

2. A device according to claim 1, and further including trigger means connected to said guide means for actuating said sealing means, anvil means and clamping means as said material is moved along said guide means towards said sealing horn.

3. A device according to claim 1, wherein said guide means includes a plate having a generally U-shaped guide path along which material to be sealed is moved towards said sealing horn.

4. A device according to claim 3, wherein a trigger means is mounted adjacent said guide path such that said material contacts and actuates said trigger means upon movement of said material along said guide path towards said sealing horn.

5. A device according to claim 1, wherein said clamping means includes first and second clamp arms, said arms being movable between an open position in which said arms are remote from said sealing horn and a closed position in which said sealing arms are disposed on either side of said sealing surface of said sealing horn.

6. A device according to claim 5, wherein said first clamp arm is abuttingly contactable with a clamp stop in said closed position, said clamp stop being disposed beyond a plane containing said sealing surface, whereby material clamped between said first arm and said clamp stop is wrapped around said sealing surface.

7. A device according to claim 5, wherein said second arm includes a cutout portion, said cutout portion, in said first position, wrapping material around said surface of said sealing horn to tighten material across said sealing surface and thereby facilitate the formation of a good seal.

8. A device according to claim 5, wherein said clamping means and said anvil means are actuated simultaneously, and prior to actuation of said sealing horn.

9. A device according to claim 1, and further including cutter means mounted adjacent said sealing horn for cutting said material after formation of a seal.

10. A device according to claim 9, wherein said cutter means includes a reciprocally movable blade having a cutting edge which is disposed at an angle with respect to said material to achieve a shearing action upon actuation of said blade.

11. A device according to claim 9, wherein said cutter means is operated pneumatically.

12. A device according to claim 1, wherein said anvil means and said clamping means are operated pneumatically.

13. A device according to claim 1, wherein said ultrasonic sealing means has two spaced-apart sealing horns.

14. A device according to claim 14 wherein a cutter means is disposed between said sealing horns.

15. A method for sealing material, comprising the steps of:
   providing a device comprising an ultrasonic sealing means, including an ultrasonic sealing horn having a sealing surface for imparting ultrasonic energy to material to be sealed;
   guide means associated with said sealing means for guiding said material along a guide path into contact with said sealing horn;
   anvil means associated with said guide means for pressing said material into sealing position against said sealing horn; and
   clamping means pivotally connected to said guide means for clamping said material beside said sealing horn, said clamping means being movable between a first position in which said clamping means clamps said material beside said sealing horn so that said material is wrapped around and stretched across said sealing surface during sealing of said material, and a second position in which said clamping means is clear of said guide path to facilitate passage of said material through said guide means;

introducing material to be sealed into contact with said sealing horn; and actuating said anvil means, clamping means and sealing means to effect formation of a seal.

16. A method according to claim 15, and further including the step of severing the material adjacent a newly formed seal.

* * * * *